United States Patent
Lingala et al.

(10) Patent No.: US 11,695,544 B2
(45) Date of Patent: Jul. 4, 2023

(54) METHOD AND SYSTEM TO EXECUTE AND RECORD TRANSACTIONS FOR A KEY IN A BLOCKCHAIN

(71) Applicant: Carrier Corporation, Palm Beach Gardens, FL (US)

(72) Inventors: Ramesh Lingala, Telangana (IN); Gowthami Vuradi, Telangana (IN); Adam Kuenzi, Salem, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 189 days.

(21) Appl. No.: 17/021,484

(22) Filed: Sep. 15, 2020

(65) Prior Publication Data

US 2021/0083850 A1    Mar. 18, 2021

(30) Foreign Application Priority Data

Sep. 17, 2019    (IN) .............................. 201911037487

(51) Int. Cl.
| | |
|---|---|
| *H04L 9/06* | (2006.01) |
| *G06F 16/23* | (2019.01) |
| *H04L 9/32* | (2006.01) |
| *H04L 9/00* | (2022.01) |

(52) U.S. Cl.
CPC ........ *H04L 9/0637* (2013.01); *G06F 16/2379* (2019.01); *H04L 9/3213* (2013.01); *H04L 9/50* (2022.05)

(58) Field of Classification Search
CPC . H04L 9/088; H04L 63/0807; H04L 2209/56; H04L 63/10; H04L 9/32; H04L 9/3213; G06Q 20/405; G06Q 20/10; G06Q 20/08; H04W 12/003; E05B 19/0005; G07C 9/00571; G07C 9/27
See application file for complete search history.

(56) References Cited

U.S. PATENT DOCUMENTS

| | | | |
|---|---|---|---|
| 2018/0189730 A1* | 7/2018 | Wilkinson | .............. G07F 17/13 |
| 2019/0333304 A1* | 10/2019 | Flynn | ...................... H04W 4/70 |
| 2020/0238952 A1* | 7/2020 | Lindsay | ........... G06V 30/19173 |
| 2021/0149356 A1* | 5/2021 | Unagami | ............. G05B 19/042 |

* cited by examiner

*Primary Examiner* — Olugbenga O Idowu
(74) *Attorney, Agent, or Firm* — Cantor Colburn LLP (57) ABSTRACT

A system and method for executing and recording transactions for a key in a blockchain. A method includes creating a smart contract on receiving a request to order a key on lease for a first period of time. The method further includes determining an availability of the key and determining an availability of digital tokens in an account of the user. The method also includes executing the smart contract for the first period of time by executing a first transaction using the digital tokens and recording the executed first transaction and the executed smart contract in a block of a block chain to provide the key on lease.

20 Claims, 5 Drawing Sheets

METHOD AND SYSTEM TO EXECUTE AND RECORD TRANSACTIONS FOR A KEY IN A BLOCKCHAIN

FOREIGN PRIORITY

This application claims priority to Indian Patent Application No. 201911037487, filed Sep. 17, 2019, and all the benefits accruing therefrom under 35 U.S.C. § 119, the contents of which in its entirety are herein incorporated by reference.

TECHNICAL FIELD OF INVENTION

The present invention generally relates to blockchain. More particularly, the invention relates to a system and a method for recording transactions in a blockchain.

BACKGROUND OF THE INVENTION

Traditionally, a user could hire a key on rent/lease only in an offline mode. In other words, the user had to physically search and find a place to take a key on lease. The user may use a key to access a premises. Further, there were limited methods of making payment for hiring a key on lease in an offline mode. With development in technology, advanced payment systems were introduced that enabled a user to make payment in an online mode for any lease. Using an internet service, a user can now easily make a payment in an online mode.

However, when a user hires a key on lease in an online mode, the user may not return the key after expiry of a lease period. Moreover, when the user takes the key on lease in an online mode, the user may access some features of the key with a key-box for which the user has not subscribed or has not made any payment while taking the key on lease. For an instance, the user may not pay additional payment for not returning the key on expiry of a lease period or for using any extra features of the key for which the user has not subscribed to. Currently there is no solution to automatically receive additional payment from the user when the key is not returned on expiry of a lease period. Also, there does not exist any way to restrict a user for not using any extra feature/s of the key for which the user has not subscribed to.

In view of the afore-mentioned problems in the existing solutions, there is a need of an efficient and effective system and a method for automatically executing transactions to order a key on lease. There is also a need to receive additional payment from a user when a key is not returned on expiry of a lease period. There is also a requirement for restricting a user for not using any extra feature/s of a key for which the user has not subscribed for. In order to solve the problems in the existing solutions, a system and a method are disclosed.

SUMMARY OF THE INVENTION

Various embodiments of the invention describe a method for recording transaction/s in a blockchain. The method comprises steps of creating a smart contract on receiving a request from a user to order a key on lease for a first period of time. The method further comprises steps of determining an availability of the key after receiving the request from the user and determining an availability of digital tokens in an account of the user on determining the availability of the key. The method further comprises steps of executing the smart contract for the first period of time by executing a first transaction using the digital tokens and recording the executed first transaction and the executed smart contract in a block of a block chain to provide the key on lease.

In another embodiment of the invention, a second smart contract is created on receiving a second request from the user to order a key on lease for a second period of time. Further, an availability of the key is determined after receiving the second request from the user and an availability of digital tokens in an account of the user key is determined based on the availability of the key. Furthermore, a second smart contract is executed for the second period of time by executing a second transaction using the digital tokens. Also, the executed second smart contract and the executed second transaction are recorded in a second block of the blockchain In a different embodiment of the invention, the smart contract enables or restrict the user to access one or more features of the key with a key-box based on a subscription of the one or more features subscribed by the user.

In an embodiment of the invention, the block is appended to the blockchain after executing the first transaction.

In another embodiment of the invention, the smart contract is automatically terminated after an expiration of the first period of time.

In yet another embodiment of the invention, the recorded in the block of the blockchain is automatically terminated after an expiration of the first period of time.

In still another embodiment of the invention, the availability of the digital tokens in the account is determined when the key is available and the availability of the digital tokens in the account is not determined when the key is not available.

In a different embodiment of the invention, the key is marked unavailable after the key is ordered by the user and the unavailability of the key is recorded in a block of the block chain.

In another embodiment of the invention, the key is ordered or accessed by the user using an application on a user device.

In a different embodiment of the invention, the user device receives credentials from a server to access a key-box having the key or one or more features of the key-box subscribed by the user. Also, the server identifies the user based on the credentials and provides access of a key-box or more features of the key-box to the user.

In a different embodiment of the invention, a system is disclosed for recording transactions in a blockchain. The system comprises a receiver adapted to receive a request from a user to order a key on lease for a first period of time and a smart contract unit adapted to create a smart contract after the receiver receives the request from the user. The system also comprises a determination unit adapted to determine an availability of the key after receiving the request from the user and determine an availability of digital tokens in an account of the user on determining the availability of the key. The system further comprises an execution unit adapted to execute the smart contract for the first period of time by executing a first transaction using the digital tokens and record the executed smart contract and the executed first transaction in a block of a blockchain to provide the key on lease.

In an embodiment of the invention, the smart contract comprises one or more features subscribed by the user to use the key.

In another embodiment of the invention, the block is appended to the blockchain after executing the first transaction.

In yet another embodiment of the invention, the smart contract is automatically terminated after an expiration of the first period of time and after the smart contract is terminated, a notification is sent from a server to the user device of the user.

In still another embodiment of the invention, the record in the block of the blockchain is automatically terminated after an expiration of the first period of time.

In a different embodiment of the invention, the availability of the digital tokens in the account is determined when the key is available. Also, the availability of the digital tokens in the account is not determined when the key is not available.

In yet another embodiment of the invention, the key is marked unavailable after the key is ordered by the user and the unavailability of the key is recorded in a block of the block chain.

In another different embodiment of the invention, a computer readable medium is disclosed for recording transaction/s in a blockchain. The computer readable medium comprises one or more processors and a memory is coupled to the one or more processors, the memory stores instructions executed by the one or more processors. The memory stores instructions executed by the one or more processors are configured to create a smart contract on receiving a request from a user to order a key on lease for a first period of time, determine an availability of the key after receiving the request from the user and determine an availability of digital tokens in an account of the user on determining the availability of the key. The memory stores instructions executed by the one or more processors are further configured to execute the smart contract for the first period of time by executing a first transaction using the digital tokens and record the executed smart contract and the executed first transaction in a block of a blockchain to provide the key on lease.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Described herein is the technology with a system and a method for executing and recording smart contract and transactions in a block of a blockchain. When a user registers with a server/platform or places an order for a key on lease, a smart contract may be automatically created between the user and the server/platform. Such a smart contract may be executed when a transaction is made by the user. Further, the transaction may be executed when the user makes a payment (for the key) using digital tokens available in an account of the user. The executed smart contract and the executed transaction may be stored in a block of a blockchain.

As used herein, the transaction may be executed using digital tokens available in an account of the user when a user makes a payment to order the key on lease. Each executed transaction may be recorded in a block of a blockchain and such a block may then be appended in a blockchain. Such an account may be associated with an identity of the user and the user may log into an application using the identity. Thus, the user may have access to the account for making a payment. As used herein the identity may a user id along with a password or PIN, biometric and the like.

As used herein, the digital tokens may be generated when a user transfers money from a bank account or a payment card of the user. The transfer of the money may be made to the account of the user. Each money transferred to the account will be converted to the digital token. For an example, 100 USD may be equivalent to 100 digital tokens.

As used herein, the smart contract may be a contract stored in a block of a blockchain. The smart contract binds two or more parties. In an embodiment of the invention, the smart contract binds a user and a key provider, for example, when a transaction is executed to order a key on lease. Also, the smart contract may be executed when the transaction is executed using digital tokens. While or after executing the smart contract, the smart contract may call a credential service that provides the key on lease to the user. The smart contract may call the credential service when payment is made by the user. On return of the key, the smart contract may call the credential service to remove the lease for the key. The credentials service may generate and provide credentials to the user to access the key. Further, the smart contract may be terminated when the user returns the key on expiration of a lease period. When the smart contract is terminated, the corresponding record of the executed smart contract and the executed transaction stored in a block of the blockchain may also automatically be deleted from that block.

As used herein, the key may be physical key/s that can be used by the user to access a premises. The key/s may be present inside a key-box, wherein the key-box may be attached to the premises. Such a key can be ordered on lease by a user for a particular period of time to access the premises. The key-box may be a holder or container for holding/keeping the physical key/s. In an exemplary embodiment, the key-box may be a digital key-box. Further, the key-box may be opened or accessed by the user using credentials. The premises may be a room, a home, a building or any such premises.

As used herein, the credentials may be generated by a credentials service or a server while or after executing the smart contract. The credentials service or the server may transmit the credentials to the user device so that the user may use the credentials to open the key-box and finally, gets access of the physical keys present inside the key-box. Such credentials may only be valid only during a time period for which the user wishes to take the key on lease. Such credentials may be a digital key, an electronic key, a code, a password, a personal identification number (PIN) or any such credentials well known in the art. In addition, the server may also record the credentials in the block of a blockchain.

As used herein, the user may be an agent or a tenant or any such person who places an order to take the key on lease. The user may place the order for the key using an application stored in a user device.

As used herein, the server has processing capabilities as disclosed further in the specification. The server may be a cloud storage, a remote database, or any such storage known in the art.

As used herein, the user device may store one or more application in a memory of the user device. The user device may be a desktop computer or a hand held device such as a mobile phone with network connectivity. Example of the user device includes a desktop, workstation PC, a laptop, a smart phone, a tablet, a wearable device and the like.

Figure 1A:
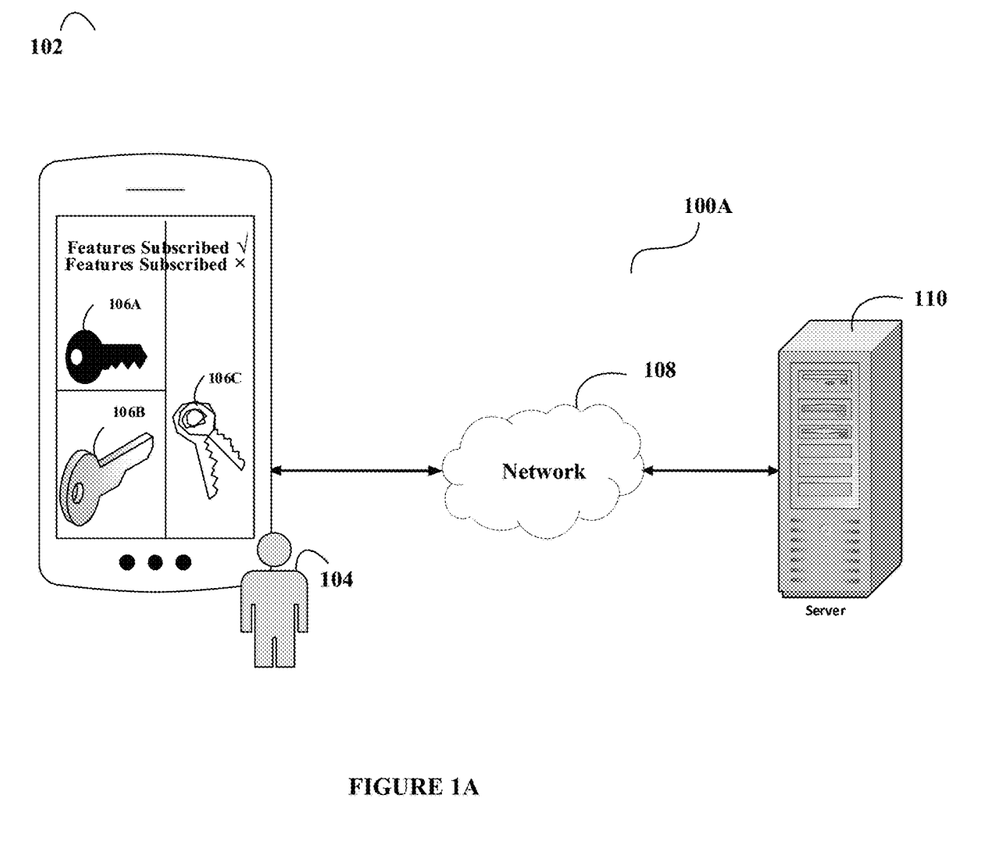
FIG. 1A depicts an exemplary system architecture according to an exemplary embodiment of the invention.

FIG. 1A depicts a system architecture 100A for executing and recording a smart contract and a transaction in a blockchain, according to an exemplary embodiment of the invention. As depicted in FIG. 1A, a user device 102, a user 104 associated with the user device 102, a key 106A/106B/106C displayed on an interface of the user device 102, a server 110 connected to the user device 102 through a network 108.

In an exemplary embodiment of the present invention, when the user 104 registers with the server 110 through the network 108, a smart contract may be created by the server 110 between the user 104 and the server 110. In specific, the user 104 may register with the server 110 using an application stored on the user device 102. In an embodiment, the user 104 may register with the server 110 when the user 104 places a request to order the key 106A/106B/106C on lease using the application stored on the user device 102. Along with the request, the user 104 may also provide details (such as name, age, date of birth, country, contact number, payment card details etc.) to the application. The application through the user device 102 may then transmit the registration request and the details of the user 104 to the server 110 using the network 108. Subsequently, the server 110 may create a smart contract between the user 104 and the server 110. In an alternative embodiment, the user 104 may register with the server when the user installs an application on the user device 102 and registers with the application by providing details (such as name, age, date of birth, country, contact number, payment card details etc.) to the application. The application on the user device 102 may then transmit such request and details of the user 104 to the server 110 through the network 108. Subsequently, the server 110 may create a smart contract between the user 104 and the server 110. When the server 110 creates the smart contract, the server 110 may store the smart contract in a block of a block chain. As used herein, the application may be provided by a manufacturer/developer of a key-box or the key 106A/106B/106C, a service-provider of a key-box or a key 106A/106B/106C, or may be any such application associated directly or indirectly with a key-box or the key 106A/106B/106C.

Further, when the user 104 opens the application in an interface of the user device 102, the application may display the key 106A/106B/106C to the user 104. The user 104 may place a request to order the key 106A/106B/106C on lease for a first period of time. For this, the user 104 may select the key 106A/106B/106C by clicking or tapping on the key 106A/106B/106C to order the key 106A/106B/106C on lease. The user 104 may also select a key from the key 106A/106B/106C based on a premises the user 104 wishes to access. Each key 106A/106B/106C may be placed inside its respective key-box and may be used to access a premises. The key-box having the key 106A/106B/106C may be attached to the premises and the key-box can be opened by the user 104 to access the key 106A/106B/106C. Alternatively, the key may be received by the user on the user device electronically and the user may be able to access the premises using the key 106A/106B/106C directly.

Considering an exemplary scenario where the user 104 may place a request to order a key 106C. The user 104 may also specify a first period of time (i.e. lease time) to hire the key 106C on lease. For an instance, the user 104 may specify a date of Sep. 25, 2019 for using the key 106C during 15:00 Hours to 17:00 Hours as a first period of time to take and use a key 106C on lease. Once the user 104 selects the key 106C and specifies the first period of time for lease, the user 104 may send a request to the server 110 through the network 108.

The server 110 may determine an availability of the key 106C for the first period of time. Determining an availability of the key 106C by the server 110 may comprise checking if the key 106C is available and not booked by any other user for the first period of time. In case the server 110 determines that the key 106C is not available for the period of time, the server 110 may transmit a message to the user device 102 through the network 108 to inform the user 104 regarding the unavailability of the key 106C for the first period of time. Moreover, if the server 110 determines that the key 106C is available for the first period of time, the server 110 may determine an availability of digital tokens in an account of the user 104. Such an account may be associated with the application through which the user 104 places the request to order the key 106C on lease for the first period of time.

When the server 110 determines that digital tokens are not available in the account of the user 104, the server 110 may transmit an alert/notification to the user device 102 through the network 108 to inform the user 104 regarding the unavailability of the digital tokens in the account. When the user 104 receives such an alert/notification, the user 104 may add the digital tokens to the account by using a payment card. Further, when the server 110 determines that the digital tokens are available in the account of the user 104, the server 110 may execute a first transaction using the digital tokens available in the account to provide the key 106C on lease. By executing the first transaction, the server 110 may also execute the smart contract for the first period of time as specified by the user 104. Then, the server 110 may further record the executed first transaction and the executed smart contract (to provide the key 106C on lease for the first period of time) in a block of a blockchain. The recording of executed transactions and executed smart contract in a block of a blockchain are explained in greater details in FIG. 3.

After recording the executed first transaction and the executed smart contract in the block of the blockchain, the server 110 may transmit a message to the user device 102 through the network 108 confirming the user 104 being provided the key 106C on lease for the first period of time. After sending the confirmation to the user, the server 110 may mark the key 106C as unavailable for any other user and may also record the unavailability of the key 106C for the first period of time in the block of the block chain. In other words, the server 110 may mark the key 106C as unavailable till the expiration of the first period of time. Further, the server 110 may terminate the executed smart contract between the user 104 and the server 110 on the expiration of the first period of time. For an instance, the executed smart contract may terminate on an expiration of "15:00 Hours to 17:00 Hours on Sep. 25, 2019" (i.e. first period of time). When the server 110 terminates the executed smart contract, the server 110 may automatically delete or remove the record of the executed smart contract and/or the executed first transaction from the block of the blockchain.

The present invention facilitates the user 104 to place a request again to order a key 106C (for an instance) on lease for a second period of time after an expiration of the first period of time as specified by the user 104. For this, the user 104 may open the application on the interface of the user device 102 that displays the key 106C. Then, the user 104 may select the key 106C and may specify/mention a second period of time for hiring the key 106C on lease. For example, the user 104 may specify a date of Sep. 25, 2019 for using the key 106C during 18:00 Hours to 19:00 Hours as second period of time. After the user 104 specifies the second period of time, the user 104 may select to send the request for taking the key 106C for the second period of time to the server 110. Subsequently, the user device 102 may transmit the request for hiring the key 106C for the second period of time to the server 110 through the network 108.

After receiving the request from the user 104, the server 110 may create a second smart contract between the user 104 and the server 110 as explained above. Also, the server 104 may determine an availability of the key 106C for the second period of time as specified by the user 104. If the server 110 determines that the key 106C is available for the second period of time, then the server 110 may determine an availability of digital tokens in the account of the user 104. In case the server 110 determines that the key 106C is not available for the second period of time, the server 110 may transmit a message to the user device 102 through the network 108 to inform the user 104 regarding the unavailability of the key 106C for the second period of time.

When the server 110 determines that the digital tokens are available in the account of the user 104, the server 110 may execute the second smart contract to provide the key 106C on the lease to the user 104 for the second period of time by executing a second transaction using the digital tokens available in the account. Moreover, the server 110 may further record the executed second transaction and the executed second smart contract (to provide the key 106C to the user 104 on lease for the second period of time) in a second block of the blockchain. After recording the executed second transaction and the executed second smart contract, the server 110 may transmit a message to the user device 102 through the network 108 confirming the user 104 being provided the key 106C on lease for the second period of time. On confirming the user 104 to provide the key 106C on lease for the second period of time, the server 110 may mark the key 106C as unavailable during the second period of time for any other user and may also record the unavailability of the key 106C for the second period of time in the second block of the block chain. Further, the server 110 may terminate the executed second smart contract between the user 104 and the server 110 on the expiration of the second period of time. For an instance, the executed smart contract may terminate on an expiration of time period of 18:00 Hours to 19:00 Hours at Sep. 25, 2019 (i.e. second period of time). On terminating the executed second smart contract, the server 110 may automatically delete or remove the record of the executed second smart contract and/or the second executed transaction from the second block of the blockchain.

The present invention facilitates the server 110 to generate credentials for the user 104 to access a key-box or one or more feature of the key-box while taking a key 106A/106B/106C on lease. The key-box holds the key 106A/106B/106C which may be used by the user 104 to access a premises. The server 110 may generate credentials for the user 104 when the user device 102 transmits a request to order a key 106A/106B/106C on lease for a first period of time or for a second period of time as discussed above. The server 110 may transmit the credentials to the user device 102 through the network 108 for accessing the key-box or accessing the one or more features of the key-box. The user 104 may use the credentials to access the key-box or access the one or more features of the key-box. The user 104 may be identified by the server 110 based on the credentials and the server 110 may provide access of the key-box or the one or more features of the key-box to the user 104 using the credentials.

Figure 1B:
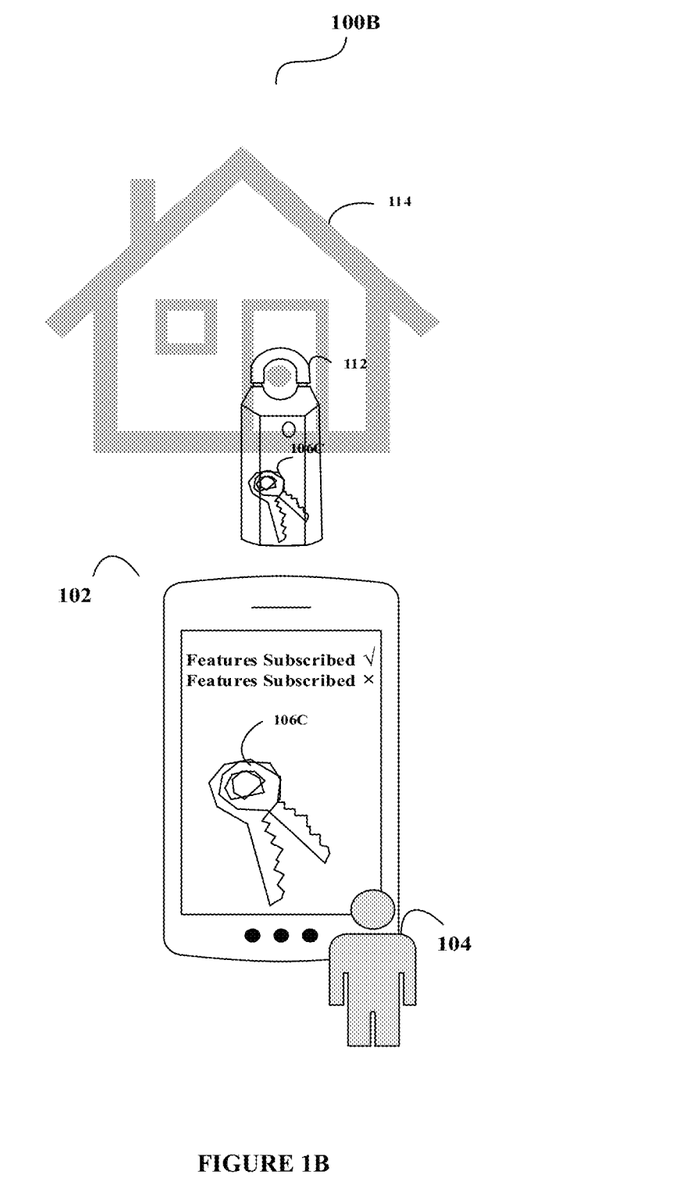
FIG. 1B depicts an exemplary scenario depicting a user accessing a key-box with a key according to an exemplary embodiment of the invention.

FIG. 1B depicts an exemplary scenario 100B depicting a user 104 accessing a key-box 112 after the user 104 reaches a premises 114 according to an exemplary embodiment of the invention. The exemplary scenario depicting a user 104 accessing a key-box 112 may only arise after the user 104 places a request to order a key 106A/106B/106C on lease for a first period of time or a second period of time and if the server 110 confirms such a request to the user 104. As depicted in FIG. 1B and considering the scenario where the user 104 has placed a request to order a key 106C on lease, the key-box 112 may be attached to a premises 114. Specifically, the key-box 112 may be hanging at a door of the premises 114 and a key 106C for opening a lock of the premises may be present inside the key-box 112. The user 104 may first unlock the key-box 112 by using the credentials received from the server 110. In an embodiment, the user 104 may use the credentials through an application to unlock the key-box 112. Once the key-box 112 gets unlocked or opened, the user 104 may take the key 106C present inside the key-box 112 and may use the key 106C to open or unlock a lock of the premises 114. The user 104 may access the key-box 112 to use the key 106C only during a first period of time or a second period of time as explained above. After the expiration of first period of time or the second period of time, the user 104 cannot access the key-box 112 and thereby cannot use the key 106C present inside the key-box 112. The user 104 may also extend the lease of the key 106C to a certain period of time in case the user 106 is unable to return the key 106C or unable place the place the key 106C back in the key-box 112 based on a request through the user account. Accordingly, the credentials for accessing the key-box 112 may be valid till the extended period of time. Such an extended period of time and an extended validity of the credentials may also be recorded in a block of the block chain.

The present invention further facilitates the user 104 to subscribe for the one or more features associated with a key-box 112 through a smart contract. The user 104 may subscribe for the one or more features associated with the key-box 112 at the time when the user 104 places a request to order a key 106A/106B/106C for a first period of time or a second period of time as depicted in FIG. 1A. The smart contract along with the subscription of the one or more features associated with the key-box 112 may be stored and recorded in a block of the block chain. As a result, the smart contract may enable the user 104 to access the one or more features of the key-box 112 which are subscribed by the user 104. Further, the smart contract may also restrict the user 104 to access the one or more features of the key-box 112 that are not subscribed by the user 104. As used herein, the one or more features may be opening or closing of a key-box 112 through an application, opening or closing of a key-box 112 through a key, sharing audits (i.e. opening or closing of a key-box 112) with any user, sharing location of the key-box 112 with any user, releasing the key-box 112, setting an access hours in the key-box 112 (times of day when the box can/can't be opened), setting a do not disturb (DND) option on the key-box 112 (i.e. no one can open it right now), setting or changing a code/credentials in the key-box 112 or any such feature that is obvious to a person skilled in the art.

In another embodiment of the present invention, the one or more features may be listed in an application on the user device 102 as depicted in FIG. 1A. The user 104 may subscribe a feature from the list in the application to subscribe for the feature. Once the user 104 subscribes the feature from the list, the feature may be enabled. In an exemplary embodiment, the subscribed feature may be highlighted with green color or a right tick mark as depicted in FIG. 1B. In another exemplary embodiment, the other features which are not subscribed by the user 104 may be highlighted with a red color or a cross/wrong tick mark as depicted in FIG. 1B. The user 104 may subscribe for any non-subscribed feature by selecting on the non-subscribed features in the list. Once the user 104 selects to subscribe for the non-subscribed feature, a request may be sent to the server 110. The server 110 may approve the request and record the subscription of features in a block of a block chain.

Figure 2:
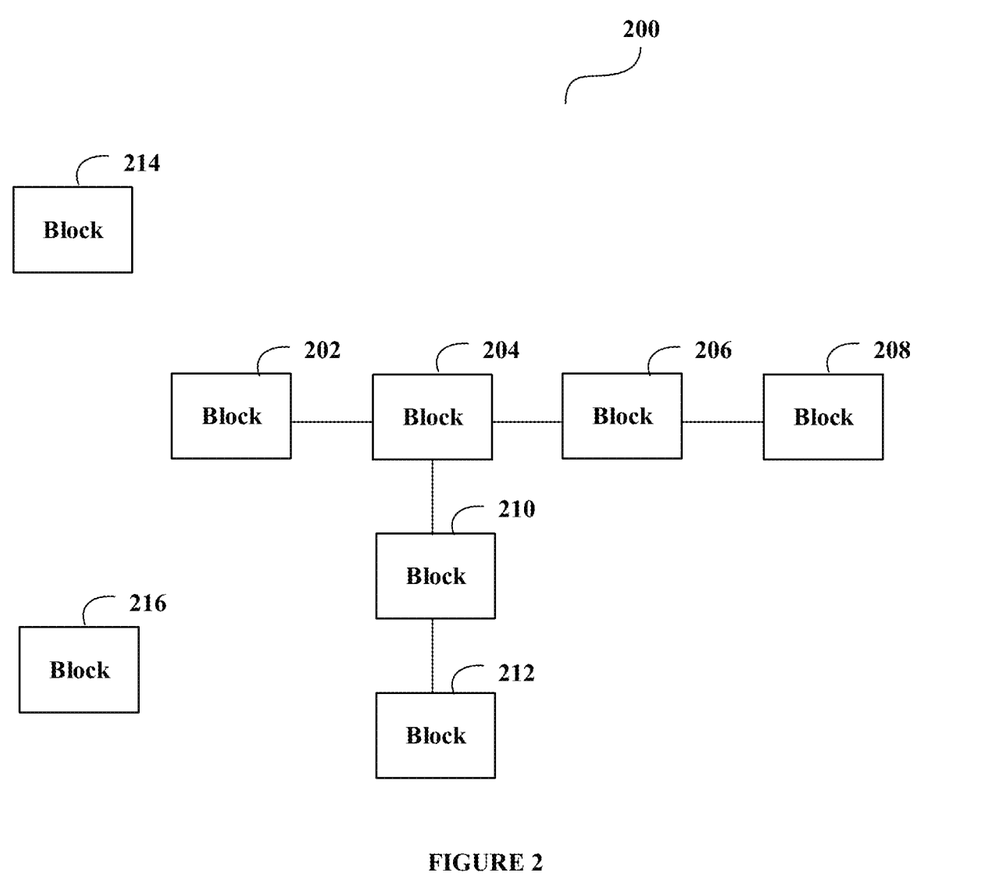
FIG. 2 depicts an exemplary blockchain having one or more blocks according to an exemplary embodiment of the invention.

FIG. 2 depicts an exemplary block chain 3200 having one or more blocks, according to an exemplary embodiment of the invention. As depicted in FIG. 2, the exemplary blockchain 200 may have six exemplary blocks namely block 202 to block 216. In particular, Block 202 may be connected with Block 204, Block 204 may be connected with Block 206 and Block 210, Block 210 may be connected Block 212, and Block 206 may be connected with Block 208. Each of these blocks 202-216 may record/s each transaction executed using digital tokens and a smart contract executed after executing the transaction. Each of these blocks 202-216 may be secured and protected using any well-known cryptographic hash function. In specific, the cryptographic hash function calculates a hash value for each block 202-216 after any record is added or deleted from the block 202-216. The hash value maintains integrity of data recorded by each block 202-216 and thus avoids any conflict or unauthorized changes made in the data recorded by each block 202-216. Further, the server 110 may create and assign a public key and a private key to each user for executing any transaction and a smart contract in a block of the blockchain 200.

Considering an example, when a user 104 registers with a server 110 as explained above in FIG. 1, a smart contract is created between the user 104 and the server 110 which is recorded in the block 214. Moreover, when a first transaction is executed using the digital tokens available in an account of the user 104, the server 110 may also record the executed first transaction in the block 214. Along with this, when the server 110 executes the smart contract for a first period of time as specified by the user 104, the server 110 may further record the executed smart contract in the block 214. The executed smart contract recorded in the block 214 may include all the details (discussed in FIG. 1 above) as specified by the user 104. Then, the server 110 may append the block 214 to the block chain 200. In specific, the server 110 may append the block 214 to the block 208 or to the block 212 depending upon the nature of the executed smart contract and the executed first transaction. After the expiration of the first period of time, the server 110 may automatically delete record of the executed smart contract and the executed first transaction from the block 214.

When the server 110 receives a second request from the user 104 for taking the key 106A/106B/106C on lease for a second period of time, the server 110 may record a second transaction in a new block 216 if the second transaction is executed using the digital tokens available in the account to provide the key 106A/106B/106C on lease for the second period of time. Also, the server 110 may record a second executed smart contract in new block 216 to provide the key 106A/106B/106C on lease for the second period of time. Furthermore, the block 216 in the server 110 may also record one or more features associated with the key-box 114 as subscribed by the user 104 through the smart contract. Then, the server 110 may append the block 216 to the block chain 200. In specific, the server 110 may append the block 216 to the block 208 or to the block 212 or to any block in the blockchain 200 depending upon the nature of the executed second smart contract and the executed second transaction. Alternatively, the executed second smart contract may be updated in block 214 if the executed second smart contract is an extension to the executed first smart contract. Also, each block may indicate that any of executed smart contract is not modified. After the expiration of the second period of time, the server 110 may automatically delete record of the executed second smart contract and the executed second transaction from the new block 216.

Figure 3:
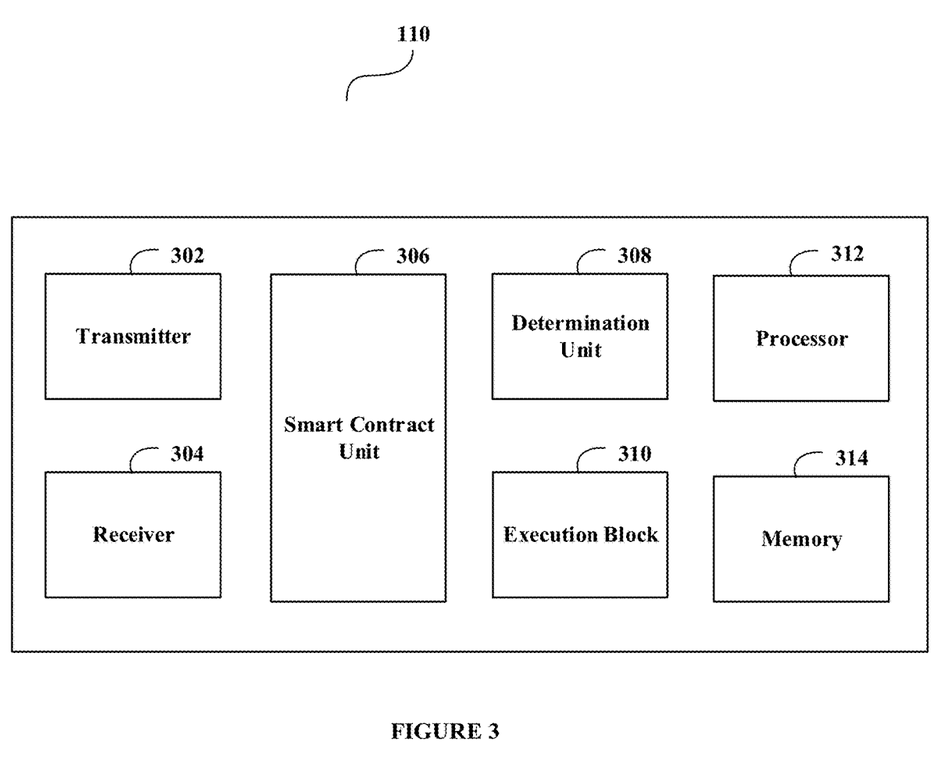
FIG. 3 depicts block diagram of different components of a system according to an exemplary embodiment of the invention.

FIG. 3 depicts a block diagram of different components of a server 110 according to an exemplary embodiment of the invention. The server 110 may comprise of, but is not limited to, a transmitter 302, a receiver 304, a smart contract unit 306, and a determination unit 308, an execution unit 310, a processor 312 and a memory 314. The receiver 304 may be adapted to receive a request along with details from a user 104 to order a key 106A/106B/106C on lease for a first period of time. The receiver 304 may also be adapted to receive a second request from the user 104 to hire the key 106A/106B/106C on lease for a second period of time. The receiver 304 may also be adapted to communicate the request or the second request received from the user 104 to the smart contract unit 306. The smart contract unit 306 may be adapted to create a smart contract and/or a second smart contract between the server 110 and the user 104 after the receiver communicates the request of the user 104 to order the key 106A/106B/106C on lease for a first period of time or a second period of time. After the smart contract unit 306 creates the smart contract or the second smart contract, the determination unit 308 may be adapted to determine an availability of the key 106A/106B/106C for the first period of time and/or the second period of time as specified by the user 104. The determination unit 306 may also be adapted to determine availability of digital tokens in an account of the user 104 if the key 106A/106B/106C is available to lease for the first period of time and/or the second period of time. Also, the determination unit 306 may also be adapted to communicate the availability of digital tokens to the execution unit 308.

The execution unit 308 may be adapted to execute a first transaction using the digital tokens in the account to provide the key 106A/106B/106C on lease for the first period of time. The execution unit 308 may also be adapted to execute a smart contract for the first period of time as specified by the user 104 by executing the first transaction. The execution unit 308 may be adapted to execute a second transaction using the digital tokens in the account to provide the key 106A/106B/106C on lease for the second period of time. The execution unit 308 may also be adapted to execute the second smart contract for the second period of time. The execution unit 308 may further be adapted to record the executed smart contract, record the executed second smart contract, record the executed first transaction, record the executed second transaction, or record the unavailability of the key 106A/106B/106C for the first/second period of time. The execution unit 308 may be in communication with the transmitter 302 to communicate an alert/notification to inform the user 104 regarding the unavailability of the digital tokens, a message to inform the user 104 regarding unavailability of the key 106A/106B/106C for the first/second period of time or a confirmation for being provided the key 106A/106B/106C to the user 104 for the first/second period of time. The transmitter 302 may be adapted to transmit the alert/notification, the message and/or the confirmation to the user device 102 of the user 104 through the network 108. Moreover, the transmitter 302, the receiver 304, the smart contract unit 306, the determination unit 308, the execution unit 310 and/or the memory 314 may be communicably coupled with the processor 312. The different units described herein are exemplary. The invention may be performed using one or more units. For example, the tasks executed by the transmitter 302, the receiver 304, the smart contract unit 306, the determination unit 308, the execution unit 310 may be performed by a single unit. Alternatively more number of units as described herein may be used to perform the invention.

Figure 4:
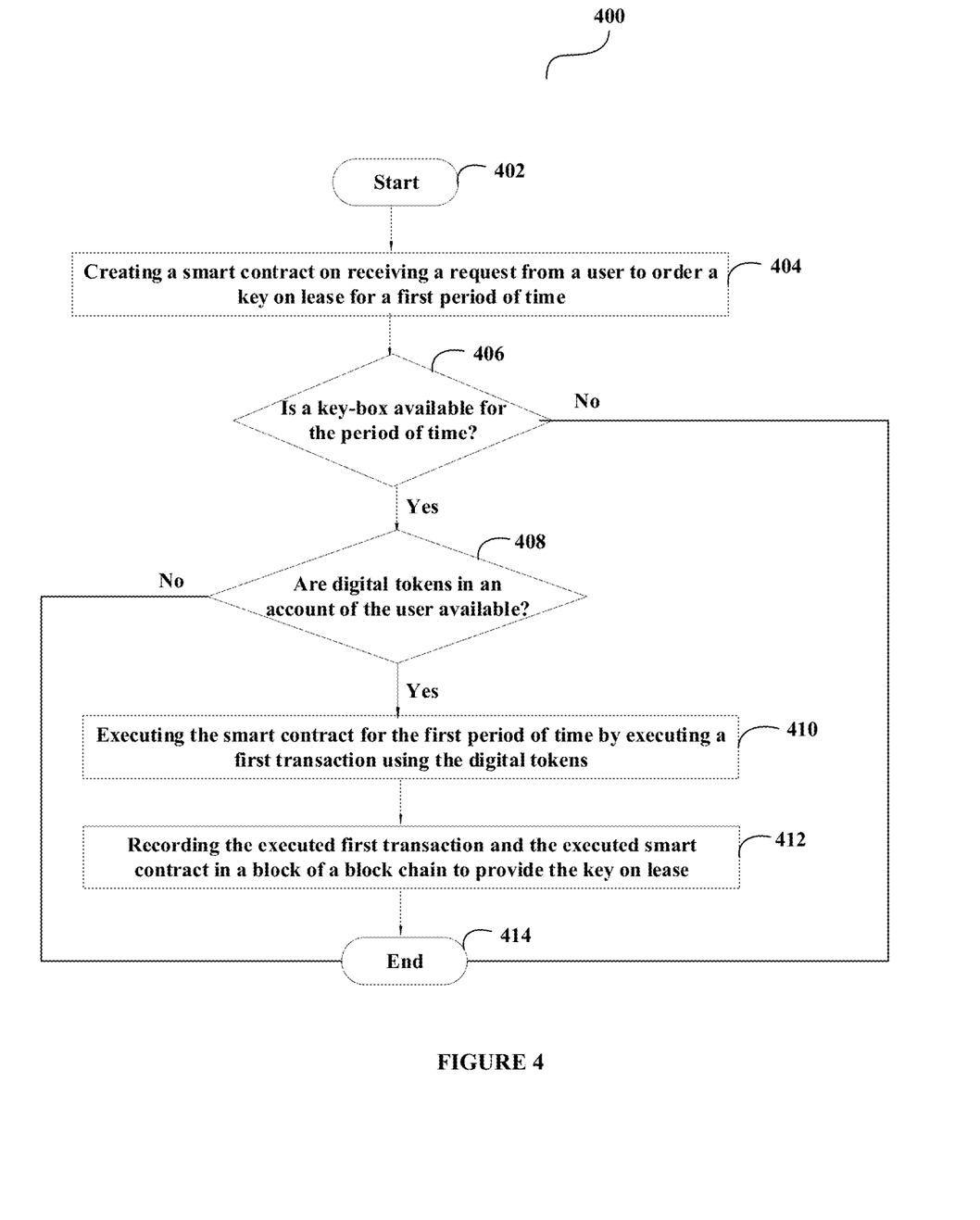
FIG. 4 depicts an exemplary flowchart illustrating a method to perform the invention according to an exemplary embodiment of the invention.

FIG. 4 depicts a flowchart outlining the features of the invention in an exemplary embodiment of the invention. The method flowchart 400 describes a method being performed for executing and recording transactions in a blockchain. The method flowchart 400 starts at step 402.

At step 404, the server 110 may create a smart contract when the server 110 receives a request from a user 104 to order a key 106A/106B/106C on lease for a first period of time.

At step 406, the server 110 may determine an availability of the key 106A/106B/106C for the first period of time as specified by the user 104 after receiving the request from the user 104. Determining an availability of the key 106A/106B/106C by the server 110 may involve checking if any key 106A/106B/106C is available which is not booked by any other user for the first period of time as specified by the user 104. In case the server 110 determines that the key 106A/106B/106C is not available for the first period of time as specified by the user 104, the method 400 may end at step 414. Moreover, if the server 110 determines that the key 106A/106B/106C is available for the first period of time as specified by the user 104, then the method 400 may move to step 408.

At step 408, the server 110 may determine an availability of digital tokens in an account of the user 104 to hire the key 106A/106B/106C on lease for the first period of time. When the server 110 determines that digital tokens are not available in the account of the user 104, then the method 400 may end at step 414. The server 110 may transmit an alert/notification to the user device 102 through the network 108 to inform the user 104 regarding the unavailability of the digital tokens in the account. Further, when the server 110 determines that the digital tokens are available in the account of the user 104, then the method 400 may move to step 410.

At step 410, the server 110 may execute the smart contract for the first period of time as specified by the user 104 by executing a first transaction using the digital tokens available in the account.

At step 412, the server 110 may record the executed first transaction and the executed smart contract (to provide the key 106A/106B/106C on lease for the first period of time as specified by the user 104) in a block of a blockchain as explained in FIG. 2 above. After recording the executed first transaction and the executed smart contract in the block of the blockchain, the server 110 may transmit a message to the user device 102 through the network 108 for confirming the user 104 to provide the key 106A/106B/106C on lease for the first period of time. The method flowchart may end at 414.

The present invention is applicable to various fields/industries such as, but is not limited to, real-estate industry, hospitality industry, banking industry, hostels, educational institutes, homes, offices, and any such field/industry where the key can be used to access a premises and is obvious to a person skilled in the art.

The present invention provides the following technical advantages over the existing solutions a) automatically creates, maintains and deletes records in a block of block chain, b) binds user and a service provider through a smart contract for using a key, c) restricts or provides access of one or more features of a key-box to the user based on user's subscription, and d) automatically records the executed transactions and the executed smart contract in a block of a block chain.

The embodiments of the invention and the tables discussed herein are exemplary and various modification and alterations to a person skilled in the art are within the scope of the invention.

In one embodiment of the invention, the invention can be operated using the one or more computer readable devices. The one or more computer readable devices can be associated with a server 110. A computer readable medium comprises one or more processors and a memory coupled to the one or more processors, the memory stores instructions executed by the one or more processors, the one or more processors configured to create a smart contract on receiving a request from a user 104 to order a key 106A/106B/106C on lease for a first period of time. The memory stores instructions executed by the one or more processors, the one or more processors configured to determine an availability of the key after receiving the request from the user 104 and determine an availability of digital tokens in an account of the user 104 on determining the availability of the key 106A/106B/106C. The memory stores instructions executed by the one or more processors, the one or more processors also configured to execute the smart contract for the first period of time by executing a first transaction using the digital tokens and record the executed smart contract and the first transaction in a block of a blockchain to provide the key 106A/106B/106C on lease.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Furthermore, the terms "user," "subscriber," "customer," "consumer," "agent," and the like are employed interchangeably throughout the subject specification, unless context warrants particular distinction(s) among the terms. Such terms can refer to human entities or automated components supported through artificial intelligence (e.g., a capacity to make inference based on complex mathematical formalisms) which can provide simulated vision, sound recognition and so forth.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
creating a smart contract between a user and a provider of a key on receiving a request from the user to order the key on lease for a first period of time;
wherein the key is provided to the user by storing the key in a key-box and providing the user with access to the key-box such that the user, subsequent to accessing the key by accessing the key-box, uses the key to access a premises;
determining an availability of the key after receiving the request from the user;
determining an availability of digital tokens in an account of the user on determining the availability of the key;
executing the smart contract for the first period of time by executing a first transaction using the digital tokens; and
recording the executed first transaction and the executed smart contract in a block of a block chain to provide the key on lease;
wherein the smart contract includes activated key-box subscriptions subscribed to by the user; and
wherein the activated key-box subscriptions enable the user to access one or more features of the key-box controlled by the activated key-box subscriptions.

2. The method of claim 1, further comprising:
creating a second smart contract on receiving a second request from the user to order a key on lease for a second period of time;
determining an availability of the key after receiving the second request from the user;
determining an availability of digital tokens in an account of the user based on the availability of the key;
executing the second smart contract for the second period of time by executing a second transaction using the digital tokens; and
recording the executed second smart contract and the executed second transaction in a second block of the blockchain.

3. The method of claim 1, wherein the smart contract restricts the user from accessing one or more features of the key-box controlled by non-activated key-box subscriptions.

4. The method of claim 1, wherein the block is appended to the blockchain after executing the first transaction.

5. The method of claim 1, wherein the smart contract is automatically terminated after an expiration of the first period of time.

6. The method of claim 1, wherein the recorded in the block of the blockchain is automatically terminated after an expiration of the first period of time.

7. The method of claim 1, wherein the availability of the digital tokens in the account is determined when the key is available and the availability of the digital tokens in the account is not determined when the key is not available.

8. The method of claim 1, wherein the key is marked unavailable after the key is ordered by the user and the unavailability of the key is recorded in a block of the block chain.

9. The method of claim 1, wherein the key is a physical key.

10. The method of claim 1, wherein:
the key is ordered or accessed by the user using an application on a user device; and
the user device receives credentials from a server to access the key-box having the key or the one or more features of the key-box subscribed by the user.

11. The method of claim 10, wherein the server identifies the user device based on the credentials and provides access of the key-box or one or more features of the key-box to the user.

12. A system comprising:
a receiver adapted to receive a request from a user to order a key on lease for a first period of time;
a smart contract unit adapted to create a smart contract between the user and a provider of the key after the receiver receives the request from the user;
wherein the key is provided to the user by storing the key in a key-box and providing the user with access to the key-box such that the user, subsequent to accessing the key by accessing the key-box, uses the key to access a premises;
a determination unit adapted to:
determine an availability of the key after receiving the request from the user; and
determine an availability of digital tokens in an account of the user on determining the availability of the key; and
an execution unit adapted to:
execute the smart contract for the first period of time by executing a first transaction using the digital tokens; and
record the executed smart contract and the executed first transaction in a block of a blockchain to provide the key on lease;
wherein the smart contract includes activated key-box subscriptions subscribed to by the user; and
wherein the activated key-box subscriptions enable the user to access one or more features of the key-box controlled by the activated key-box subscriptions.

13. The system of claim 12, wherein the smart contract restricts the user from accessing one or more features of the key-box controlled by non-activated key-box subscriptions.

14. The system of claim 12, wherein the block is appended to the blockchain after executing the first transaction.

15. The system of claim 12, wherein the smart contract is automatically terminated after an expiration of the first period of time and after the smart contract is terminated, a notification is sent from a server to the user device of the user.

16. The system of claim 12, wherein the record in the block of the blockchain is automatically terminated after an expiration of the first period of time.

17. The system of claim 12, wherein the availability of the digital tokens in the account is determined when the key is available.

18. The system of claim 12, wherein the availability of the digital tokens in the account is not determined when the key is not available.

19. The system of claim 12, wherein the key is marked unavailable after the key is ordered by the user and the unavailability of the key is recorded in a block of the block chain.

20. A computer readable medium comprising one or more processors and a memory coupled to the one or more processors, the memory storing instructions being executed by the one or more processors, the one or more processors configured to:
create a smart contract between a user and a provider of a key on receiving a request from the user to order the key on lease for a first period of time;
wherein the key is provided to the user by storing the key in a key-box and providing the user with access to the key-box such that the user, subsequent to accessing the key by accessing the key-box, uses the key to access a premises;
determine an availability of the key after receiving the request from the user;
determine an availability of digital tokens in an account of the user on determining the availability of the key;
execute the smart contract for the first period of time by executing a first transaction using the digital tokens; and
record the executed smart contract and the executed first transaction in a block of a blockchain to provide the key on lease;
wherein the smart contract includes activated key-box subscriptions subscribed to by the user; and
wherein the activated key-box subscriptions enable the user to access one or more features of the key-box controlled by the activated key-box subscriptions.

\* \* \* \* \*